Nov. 17, 1936.   A. TANZEN   2,060,956
FILM ROLL
Filed Aug. 18, 1934

Inventor:
August Tanzen,
By   Attorney
Philip S. Hopkins.

Patented Nov. 17, 1936

2,060,956

UNITED STATES PATENT OFFICE 2,060,956

FILM ROLL

August Tanzen, Dessau-Haideburg in Anhalt, Germany, assignor to Agfa Ansco Corporation, Binghamton, N. Y., a corporation of New York Application August 18, 1934, Serial No. 740,501
In Germany August 19, 1933

2 Claims. (Cl. 95—9)

My present invention relates to a roll of film.

Figure 1:
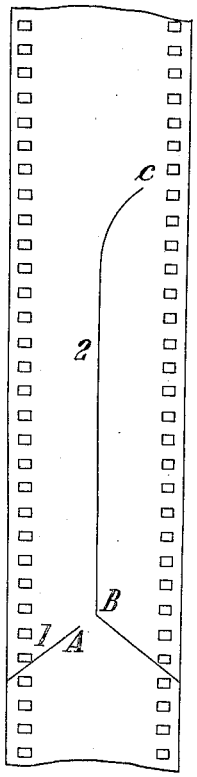
Figure 2:
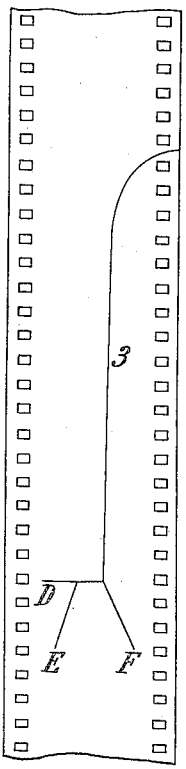
Figure 3:
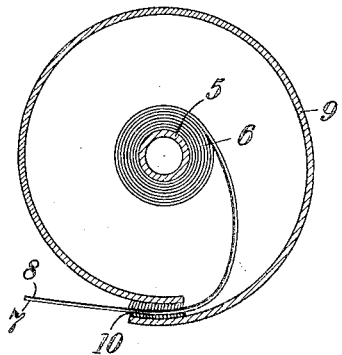

One of its objects is an improved roll of film. Further objects will be seen from the detailed specification following hereafter. Reference is made to the accompanying drawing in which Figs. 1 and 2 show incisions in the film in order to separate it into the required lengths according to this invention and Fig. 3 shows a section of a container with a roll of film according to the invention.

In rolls of films which are to be separated into lengths, the film strip is cut out at the parts to be broken on each side of the middle line as far as a very narrow middle bridge, in order to facilitate the work of the operator in separating the several lengths. The recesses or notches made in the film in this manner have the disadvantage that the film is damaged in the usual lengthy storage as a roll, owing to the edges of the notches pressing on the sensitive layer of the subjacent turn of the film, thus producing latent marks which become visible by development.

In order to avoid the production of compressed places the present invention ensures that the film strip is supported at all points of the winding as far as possible and, above all, in the middle and at the two edges. This is accomplished by refraining from removing from the film strip any film material by cutting or stamping; instead the several film lengths are given the form necessary for use in the camera by merely shaping their ends by means of one or more slits in the film material which terminate short of the edges of the film or short of each other. For separating a length the user need merely break the film strip between the slits and the edges of the film or between the slits themselves.

There are several possibilities for giving the film the desired form, of which two are illustrated in the accompanying drawing.

Fig. 1 is a film strip which has one rectilinear inclined slit 1 and a curved slit 2. For separating a length of film the user has only to break the film strip between the end A of the slit 1 and the point of the angle B in the slit 2. In order that the remaining end of the film may also be made ready for use it is only necessary to break through the film between the end C of the slit 2 and the right hand edge of the film.

Fig. 2 shows a film strip wherein there has been made at the place for separation only a single 4-part slit 3. In order to separate a film length and to make each film suitable at the broken end for introduction into the camera, the user has merely to break through the narrow places from the end points D, E and F of the slit to the left and right hand edges respectively of the strip.

Fig. 3 shows a roll of film 6 with the support 7 and the emulsion layer 8 wound on a core 5 and inserted in a container 9 from which it can be withdrawn through the slit 10 lined with velvet or a like material to ensure a light tight closure.

What I claim is:

1. A roll of photographic film which is to be separated into lengths comprising a centrally disposed longitudinal slit of substantial length and approaching at one end closely one side of said film, and at least two slits approaching the other end of said longitudinal slit and two of said last named slits approaching a different film side, to provide for subsequent separation of the film sections.

2. A roll of photographic film which is to be separated into lengths comprising a centrally disposed longitudinal slit of substantial length curved outwardly at one end, and a transverse slit of substantial length coacting with the other end of said longitudinal slits, to provide for subsequent separation of the film sections, the ends of said slits approaching close to, but at least two of the ends of different slits terminating short of points of severance.

AUGUST TANZEN.